US005709391A

United States Patent [19]

Arakawa et al.

[11] Patent Number: 5,709,391

[45] Date of Patent: Jan. 20, 1998

[54] BIT MOUNTING DEVICE

[75] Inventors: Takuo Arakawa; Yasutoshi Shimma; Eiichi Futamura, all of Anjo, Japan

[73] Assignee: Makita Corporation, Anjo, Japan

[21] Appl. No.: 706,229

[22] Filed: Sep. 4, 1996

[30] Foreign Application Priority Data

Sep. 6, 1995 [JP] Japan .................................... 7-229215

[51] Int. Cl.[6] ............................ B23B 31/11; B23B 45/16

[52] U.S. Cl. .............................. 279/19.4; 279/75; 279/82

[58] Field of Search ........................... 279/19, 19.3–19.5, 279/75, 74, 82, 904, 905; 408/226

[56] References Cited

U.S. PATENT DOCUMENTS

| | | | |
|---|---|---|---|
| 1,346,341 | 7/1920 | Schinkez | 279/19.4 |
| 1,387,493 | 8/1921 | Keller et al. | 279/19.4 |
| 3,788,658 | 1/1974 | Benjamin et al. | 279/75 |
| 4,502,824 | 3/1985 | Dohse et al. | 409/234 |

FOREIGN PATENT DOCUMENTS

| | | |
|---|---|---|
| 0298027 | 1/1989 | European Pat. Off. . |
| 3516542 | 2/1990 | Germany . |
| 3506008 | 8/1992 | Germany . |
| 4136608 | 5/1993 | Germany . |
| 3516541 | 3/1994 | Germany . |
| 4401663 | 7/1995 | Germany . |
| 5-18062 | 5/1993 | Japan . |

*Primary Examiner*—Steven C. Bishop
*Attorney, Agent, or Firm*—Dennison, Meserole, Pollack & Scheiner

[57] ABSTRACT

A bit mounting device is adapted for removably mounting a bit on a tool which has a barrel including a mounting hole adapted for receiving the bit. The bit mounting device includes an engaging member engageable with the bit and a control member mounted on the barrel. The control member is movable between a holding position and a releasing position. The control member in the holding position is operable to fix the engaging member in an engaging position for engagement with the bit. The control member in the releasing position is operable to permit the engaging member to move from the engaging position to a disengaging position for disengagement from the bit. A stopper mechanism is operable to hold the control member in the releasing position when the bit is removed from the barrel.

15 Claims, 13 Drawing Sheets

BIT MOUNTING DEVICE

FIELD OF THE INVENTION

The present invention relates to a device for mounting a bit on a tool such as a portable hammer drill.

DESCRIPTION OF THE PRIOR ART

Various devices such as a device disclosed in Japanese Utility Model Publication No. 5-18062 have been proposed to mount a bit on a portable tool. A typical bit mounting device shown in FIG. 15 includes a pair of keys 102 which are disposed on the lateral side of a barrel 101. The barrel 101 has a bit mounting hole 100 formed therein. The keys 102 are movable in a diametrical direction (a vertical direction as viewed in FIG. 15) of the bit mounting hole 100. A control sleeve 103 is axially slidably fitted on the barrel 101 and is positioned on the outside of the keys 102. The control sleeve 103 is normally biased in a forward direction (left side direction as viewed in FIG. 15) by a compression coil spring 104. An operation sleeve 105 is axially slidably mounted on a front end of the barrel 101 and is operable by an operator for moving the control sleeve 103 forwardly and rearwardly.

The control sleeve 103 has an inner wall formed to have a stepped configuration in the axial direction, so that a key holding portion 103*a* having a smaller inner diameter and a key releasing portion 103*b* having a larger inner diameter are formed by the left side part and the right side part of the control sleeve 103, respectively. The operation sleeve 105 is movable between a frontmost position and a rearmost position. When the operation sleeve 105 is in the frontmost position, the key holding portion 103*a* of the key control sleeve 103 confronts the keys 102. On the other hand, when the operation sleeve 105 is in the rearmost position, the key releasing portion 103*b* confronts the outside surfaces of the keys 102.

With this construction, when an operator moves the operation sleeve 105 rearwardly to move the control sleeve 103 rearwardly against the biasing force of the compression coil spring 104, the key releasing portion 103*b* of the control sleeve 103 is positioned to confront the outer surfaces of the keys 102 (the state shown on the lower side of FIG. 15), so that the keys 102 can be moved outwardly in the diametrical direction of the barrel 101. In this state, a bit B can be inserted into and removed from the bit insertion hole 100. When the operator releases the operation sleeve 105, the control sleeve 103 as well as the operation sleeve 105 returns to the frontmost position by the biasing force of the spring 104 (the state shown on the upper side of FIG. 15), so that the keys 102 are forced in a direction radially inward of the barrel 101 by the key holding portion 103*a*. The keys 102 therefore protrude into the interior of the bit mounting hole 100 and are brought to engage their corresponding key recesses Ba formed in the bit B so as to fix the bit B in position. As the result, the bit B cannot be removed from the barrel 101.

However, with the conventional bit mounting device, since the control sleeve 103 is normally biased toward the frontmost position, the control sleeve 103 is returned to the frontmost position when the operator releases the operation sleeve 105 after the bit B has been removed from the bit mounting hole 100. When the control sleeve 103 is in the frontmost position, the key holding portion 103*a* confronts the outer surfaces of the keys 102, so that the keys 102 cannot be moved outwardly in the radial direction. For this reason, in order to remount the bit B on the barrel 101, the operator must move the operation sleeve 105 rearwardly to move the control sleeve 103 in the same direction from the frontmost position to the rearmost position where the key releasing portion 103*b* confronts the keys 102 to permit movement of the keys 102 radially outward. Therefore, the mounting operation of the bit is very troublesome.

SUMMARY OF THE INVENTION

It is, accordingly, an object of the present invention to provide a bit mounting device which is operable to easily perform a bit mounting operation.

It is another object of the present invention to provide a bit mounting device which does not require to operate a control sleeve when a bit is to be mounted.

According to the present invention, there is provided a bit mounting device for removably mounting a bit on a tool which has a barrel including a mounting hole adapted for receiving the bit, comprising:

- an engaging member engageable with the bit;
- a control member mounted on the barrel and movable between a holding position and a releasing position, the control member in the holding position being operable to fix the engaging member in an engaging position for engagement with the bit, and the control member in the releasing position being operable to permit the engaging member to move from the engaging position to a disengaging position for disengagement from the bit; and
- a stopper mechanism operable to hold the control member in the releasing position when the bit is removed from the barrel.

With this construction, since the control member can be held in the releasing position when the bit is removed from the barrel, an operator does not require to move the control member from the holding position to the releasing position.

When the bit is inserted into the mounting hole, the stopper mechanism permits the control member to move from the releasing position to the holding position, so that the engaging member is held in engagement with the bit when the control member is moved to the holding position.

Thus, the operation for mounting the bit on the tool can be easily performed.

The engaging member may be a key engageable with a key recess formed in the bit, and the control member may be a control sleeve axially movably fitted on the barrel.

The invention will become more apparent from the appended claims and the description as it proceeds in connection with the drawings.

DETAILED DESCRIPTION OF THE PREFERRED EMBODIMENTS

Various embodiments of the present invention will now be explained with reference to FIGS. 1 to 14.

Figure 1:
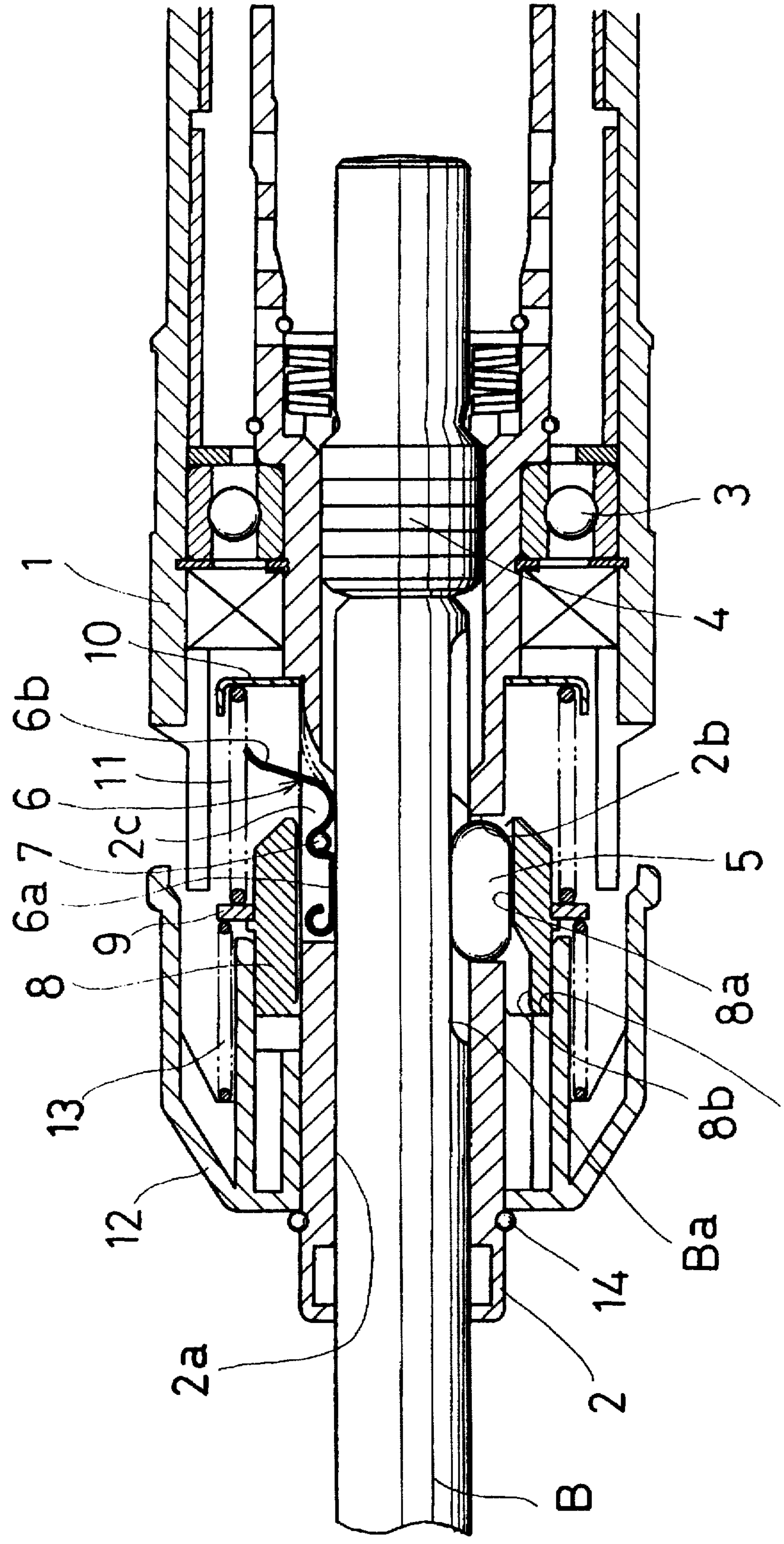
FIG. 1 is a vertical sectional view, taken along line I—I in FIG. 2, of a hammer drill incorporating a bit mounting device according to a first embodiment of the present invention and showing the state where the bit is mounted on the drill.
Figure 2:
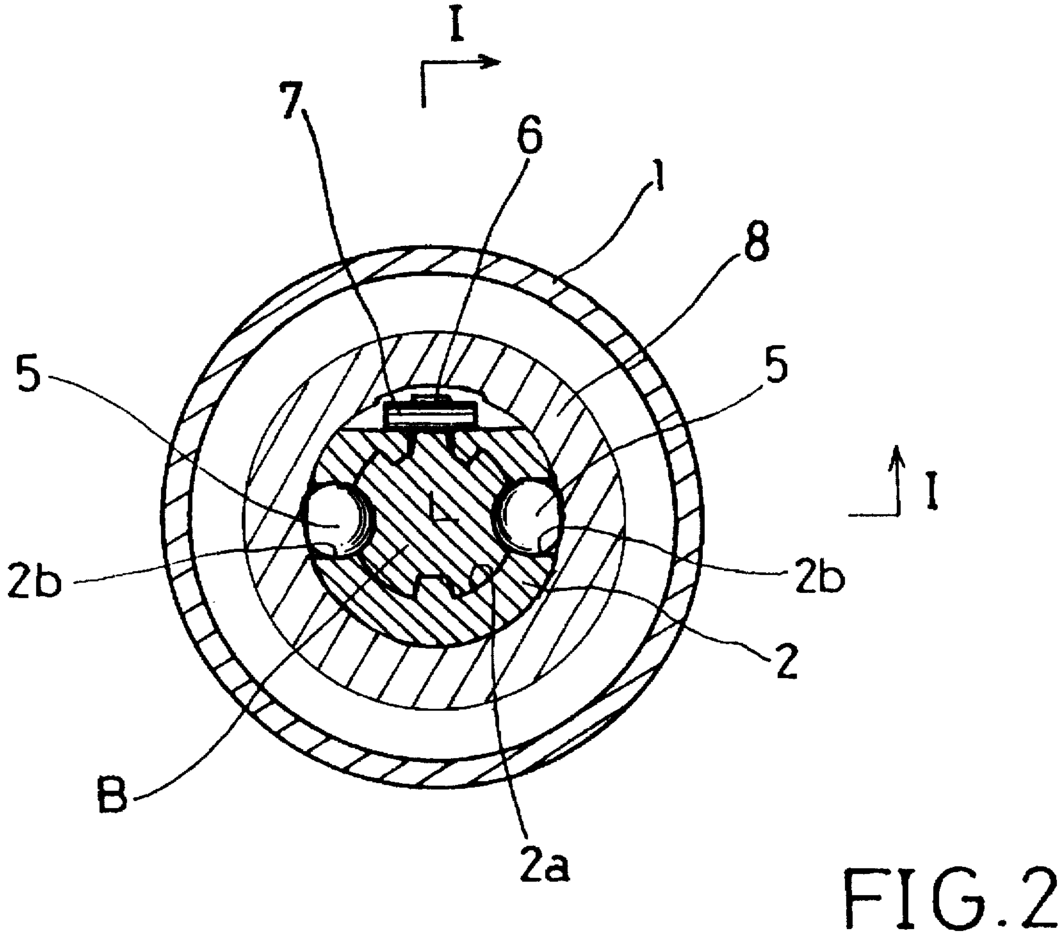
FIG. 2 is a cross sectional view of the essential parts of the mounting device.

FIG. 1 shows a vertical sectional view of the essential parts of a hammer drill incorporating a bit mounting device according to a first embodiment of the present invention.

The hammer drill includes a drill body having a casing 1. The casing 1 has a cylindrical front portion within which a barrel 2 is rotatably supported by means of a bearing 3. The barrel 2 has a substantially cylindrical configuration and is rotatably driven by a motor (not shown) disposed within the drill body. A striker 4 is axially movably received within the rear portion of the barrel 2. An impact device (not shown) is disposed within the drill body and is driven by the motor for applying axial impacts on the rear end of the striker 4 and subsequently on the rear end of a bit B.

The bit mounting device will now be explained.

The barrel 2 has a front portion including a mounting hole 2*a* formed therein for receiving the bit B. A pair of key receiving holes 2*b* (see FIG. 2) are formed in the barrel 2 in the axially middle position of the mounting hole 2*a*. The key receiving holes 2*b* are opposed to each other in the diametrical direction of the barrel 2. A key 5 is received within each key receiving hole 2*b* such that each key 5 is movable in the radial direction of the corresponding key receiving hole 2*b* so as to protrude into the mounting hole 2*a* and to retract from the same. Each key 5 has a cylindrical configuration and has hemispherical ends on both sides.

A window 2*c* is formed in the barrel 2 and is displaced from the key receiving holes 2*b* at right angles in the circumferential direction. A leaf spring 6 is disposed within the window 2*c* and serves as a stopper as will be explained later. The leaf spring 6 is made of a strip-like spring plate having a uniform width. The spring plate is bent in substantially S-shaped configuration as shown in FIG. 1 to form the leaf spring 6. The leaf spring 6 has a middle portion pivotally supported by the barrel 2 by means of a support pin 7 which extends between two circumferentially confronting walls of the window 2*c* and is fixed to these walls. The leaf spring 6 has a front portion 6*a* and a rear portion 6*b*. As shown in FIG. 1, when the front portion 6*a* is in a position not to protrude outwardly from the barrel 2, the rear portion 6*b* protrudes outwardly from the barrel 2. On the other hand, as shown in FIG. 3, when the rear portion 6*b* protrudes into the mounting hole 2*a*, the front portion 6*a* protrudes outwardly from the barrel 2.

An annular control sleeve 8 is axially movably fitted on the barrel 2. The control sleeve 8 has an inner wall which has a stepped configuration in the axial direction, so that a key holding portion 8*a* having a smaller inner diameter and a key releasing portion 8*b* having a larger inner diameter are formed on the rear and front sides of the control sleeve 8, respectively. When the control sleeve 8 is in a frontmost position shown in FIG. 1, the key holding portion 8*a* radially confronts each key 5 so as to hold the same in position such that a part of each key 5 protrudes into the mounting hole 2*a*. Thus, the part of each key 5 is held in engagement with its corresponding key recess Ba formed in the bit B to prevent the bit B from being removed.

Figure 3:
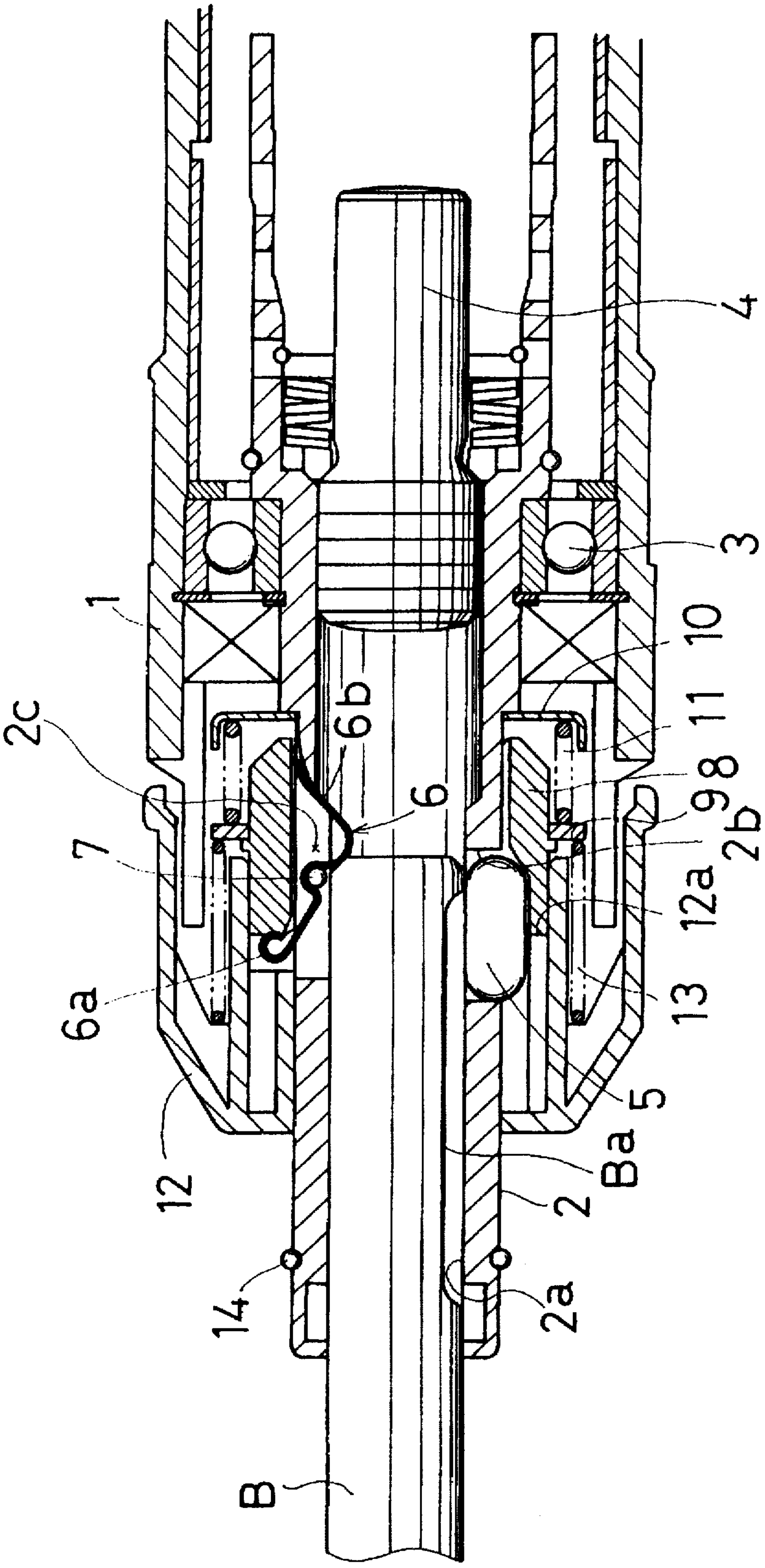
FIG. 3 is a view similar to FIG. 1 but showing the state where the bit is about to be removed from the drill.

When the control sleeve 8 is in the rearmost position shown in FIG. 3, the key releasing portion 8*b* radially confronts each key 5 so as to permit movement of the same to a position not to protrude into the mounting hole 2*a*. Thus, the bit B can be removed from the mounting hole 2*a* of the barrel 2 or can be remounted on the same.

In addition, when the control sleeve 8 is in the frontmost position shown in FIG. 1, the control sleeve 8 prevents the front portion 6*a* of the leaf spring 6 from protruding outwardly from the barrel 2, so that the rear portion 6*b* protrudes outwardly from the barrel 2.

When the control sleeve 8 is in the rearmost position, and when the bit B is moved forwardly to some extent for removal from the barrel 2, the control sleeve 8 permits the rear portion 6*b* of the leaf spring 6 to protrude into the mounting hole 2*a*, so that the front portion 6*a* of the leaf spring 6 protrudes outwardly from the barrel 2 in a position forwardly of the control sleeve 8. As the result, the control sleeve 8 is prevented from moving forwardly from the rearmost position and is held in this position. Since the control sleeve 8 is thus held in the rearmost position, the keys 5 can be moved outwardly to retract from the mounting hole 2*a*, so that the bit B can be remounted on the barrel 2.

A compression coil spring 11 is interposed between flange members 9 and 10 which are mounted on the control sleeve 8 and the barrel 2, respectively, so that the control sleeve 8 is normally biased toward the frontmost position. Thus, the leaf spring 6 serves to hold the control sleeve 8 in the rearmost position against the force of the compression coil spring 11.

An operation sleeve 12 is axially movably fitted on the front end of the barrel 2. A compression spring 13 is interposed between the operation sleeve 12 and the flange member 9 so as to normally bias the operation sleeve 12 in the forward direction. The operation sleeve 12 has an inner part including an abutting surface 12*a* for abutting on the front end of the control sleeve 8. When an operator moves the operation sleeve 12 rearwardly against the biasing force of the compression coil spring 13, the abutting surface 12*a* is brought to abut on the front end of the control sleeve 8, and then the control sleeve 8 is moved rearwardly against the biasing force of the compression spring 11. When the operator releases the operation sleeve 12, the operation sleeve 12 returns to the frontmost position by the biasing force of the compression coil spring 13. A stopper ring 14 is fitted on the front end of the barrel 2 for defining the frontmost position of the operation sleeve 12.

The operation of the mounting device of the above embodiment will now be explained.

In the mounting state of the bit B shown in FIG. 1, the keys 5 are in engagement with the corresponding key recesses Ba of the bit B inserted into the mounting hole 2*a*. The operation sleeve 12 is held in the frontmost position by the compression coil spring 13. The control sleeve 8 is held in the frontmost position, so that the key holding portion 8*a* radially confronts the keys 5. Thus, the keys 5 cannot be moved radially outward and are held in engagement with their corresponding key recesses Ba. As the result, the bit B cannot be removed from the barrel 2.

In this mounting state, since the control sleeve 8 is in the frontmost position, the front portion 6*a* of the leaf spring 6 does not protrude outwardly from the barrel 2. The rear portion 6*b* of the leaf spring 6 however protrudes outwardly from the barrel 2 such that its protruding part is positioned rearwardly away from the control sleeve 8.

In order to remove the bit B from the barrel 2, the operator moves the operation sleeve 12 rearwardly against the biasing force of the compression spring 13, so that the control sleeve 8 is moved rearwardly against the biasing force of the compression coil spring 11. During this rearward movement of the control sleeve 8, the rear end of the control sleeve 8 abuts on the rear portion 6*b* of the leaf spring 6 to cause resilient deformation of the rear portion 6*b*, so that the rear portion 6*b* is pressed on the bit B. The state of such resilient deformation of the rear portions 6 is shown by chain lines in FIG. 1. When the control sleeve 8 is further moved rearwardly, the key releasing portion 8*b* is brought to confront the keys 5 so as to permit movement of the keys 5 in a direction radially outwardly from the mounting hole 2*a*. As the result, the bit B can be removed from the mounting hole 2*a*.

As shown in FIG. 3, when the bit B is moved relative to the barrel 2 to some extent for removal from the barrel 2, the rear portion 6*b* of the leaf spring 6 which has been pressed on the bit B restores its shape to partly protrude into the mounting hole 2*a*, so that the leaf spring 6 is pivoted about the support pin 7 in a clockwise direction in FIG. 3. As the result, the front portion 6*a* of the leaf spring 6 protrudes outwardly from the barrel 2 such that its front end is positioned forwardly of the control sleeve 8 and contacts therewith so as to hold the control sleeve 8 in position against the biasing force of the compression coil spring 11.

The front portion 6*a* of the leaf spring 6*a* is held in abutment on the control sleeve 8 even after the bit B has been removed from the mounting hole 2*a*. The control sleeve 8 is held in the rearmost position although the operation sleeve 12 returns to the frontmost position by the force of the compression coil spring 13. This means that the key releasing portion 8*b* is held to confront the keys 5, so that the keys 5 are permitted to retract from the mounting hole 2*a*.

Thus, even after the operation sleeve 12 has been returned to the frontmost position, the control sleeve 8 is held in the rearmost position or the position resulting from the rearward movement of the operation sleeve 12. Therefore, the operator is not required to move the operation sleeve 12 rearwardly prior to remounting the bit B.

When the operator again inserts the bit B into the mounting hole 2*a* of the barrel 2, the rear end of the bit B abuts on the rear portion 6*b* of the leaf spring 6 which protrudes into the mounting hole 2*a*, so that the rear portion 6*b* is moved radially outward from the mounting hole 2*a*. The leaf spring 6 is therefore pivoted in a counterclockwise direction and the front portion 6*a* of the leaf spring 6 returns to the position where the front portion 6*a* does not protrude outwardly from the barrel 2 and does not confront the control sleeve 8 in the axial direction.

When the front portion 6*a* of the leaf spring 6 is thus retracted from the position confronting the control sleeve 8, the control sleeve 8 is returned to the frontmost position by the force of the compression coil spring 11. At this stage, the operation sleeve 12 has already been returned to its frontmost position. The key holding portion 8*a* therefore confronts the keys 5 to prevent them from moving radially outward. The keys 5 are therefore held in engagement with their corresponding key recesses Ba, so that the bit B is fixed in position relative to the barrel 2 as shown in FIG. 1.

As described above, with this embodiment, although the operator is required to move the operation sleeve 12 rearwardly for removing the bit B, he is not required to move the operation sleeve 12 rearwardly for remounting the bit B. Thus, as the operator moves the operation sleeve 12 rearwardly for removing the bit B, the control sleeve 8 is moved in the same direction. After the bit B has been removed, the control sleeve 8 is held in the rearmost position by means of the stopper member or the leaf spring 6, so that the bit B can be inserted into the mounting hole 2*a* for remounting on the barrel 2. When the bit B is inserted into the mounting hole 2*a*, the leaf spring 6 automatically releases the control sleeve 8 to permit its movement in the forward direction, and the bit B can be consequently remounted to be fixed in position relative to the barrel 2. Therefore, the mounting device of this embodiment provides a superior operability in mounting the bit B in comparison with the conventional mounting device.

The above first embodiment may be modified to eliminate the compression coil spring 13, so that the operation sleeve 12 is moved together with the control sleeve 8 to return to the frontmost position by the force of the compression coil spring 11. Thus, the control sleeve 8 and the operation sleeve 12 may be formed integrally with each other. In case of incorporation of such an integral construction, the operation sleeve 12 as well as the control sleeve 8 is held in the rearmost position after the bit B has been removed by moving the operation sleeve 12 rearwardly together with the control sleeve 8. The leaf spring 6 releases the operation sleeve 12 as well as the control sleeve 8 as the bit B is again inserted into the mounting hole 2*a*, so that the operation sleeve 12 and the control sleeve 8 are returned together to their frontmost positions.

Second to fourth embodiments of the present invention will now be described. These embodiments are modifications of the first embodiment. Therefore, like members are given the same reference numerals and their description will not be repeated.

The second embodiment of the present invention will now be described with reference to FIGS. 4 to 6. Although, with the mounting device of the first embodiment, the leaf spring 6 is incorporated to directly prevent the control sleeve 8 from moving forwardly, a bit mounting device of the second embodiment incorporates a stopper mechanism 20 consisting of a rigid stopper member 21 and a leaf spring 22 which is adapted to bias the stopper member 21.

A window 2*d* is formed in the barrel 2 and is adapted to receive the stopper member 21 which is pivotally mounted on the inner wall of the window 2*d* by means of a support pin 23. The leaf spring 22 is fitted on the barrel 2 in a position forward of the stopper member 21 and serves to force a front portion 21*a* of the stopper key 21 in direction radially inward of the barrel 2 (downward as viewed in the drawings) so as to pivotally move the stopper member 21 in a counterclockwise direction in the drawings.

Like the control sleeve 8 of the first embodiment, a control sleeve 24 of this embodiment has a holding portion 24*a* and a releasing portion 24*b*. In addition, a releasing recesses 24*c* is formed in an inner wall of the control sleeve 24 and radially confronts the window 2*d*. The releasing recess 24*c* extends rearwardly from the front end of the control sleeve 24 by a predetermined distance and serves to receive a rear portion 21*b* of the stopper member 21 when the stopper member 21 is pivoted in the counterclockwise direction.

The operation of the bit mounting device of the second embodiment will now be explained.

Figure 4:
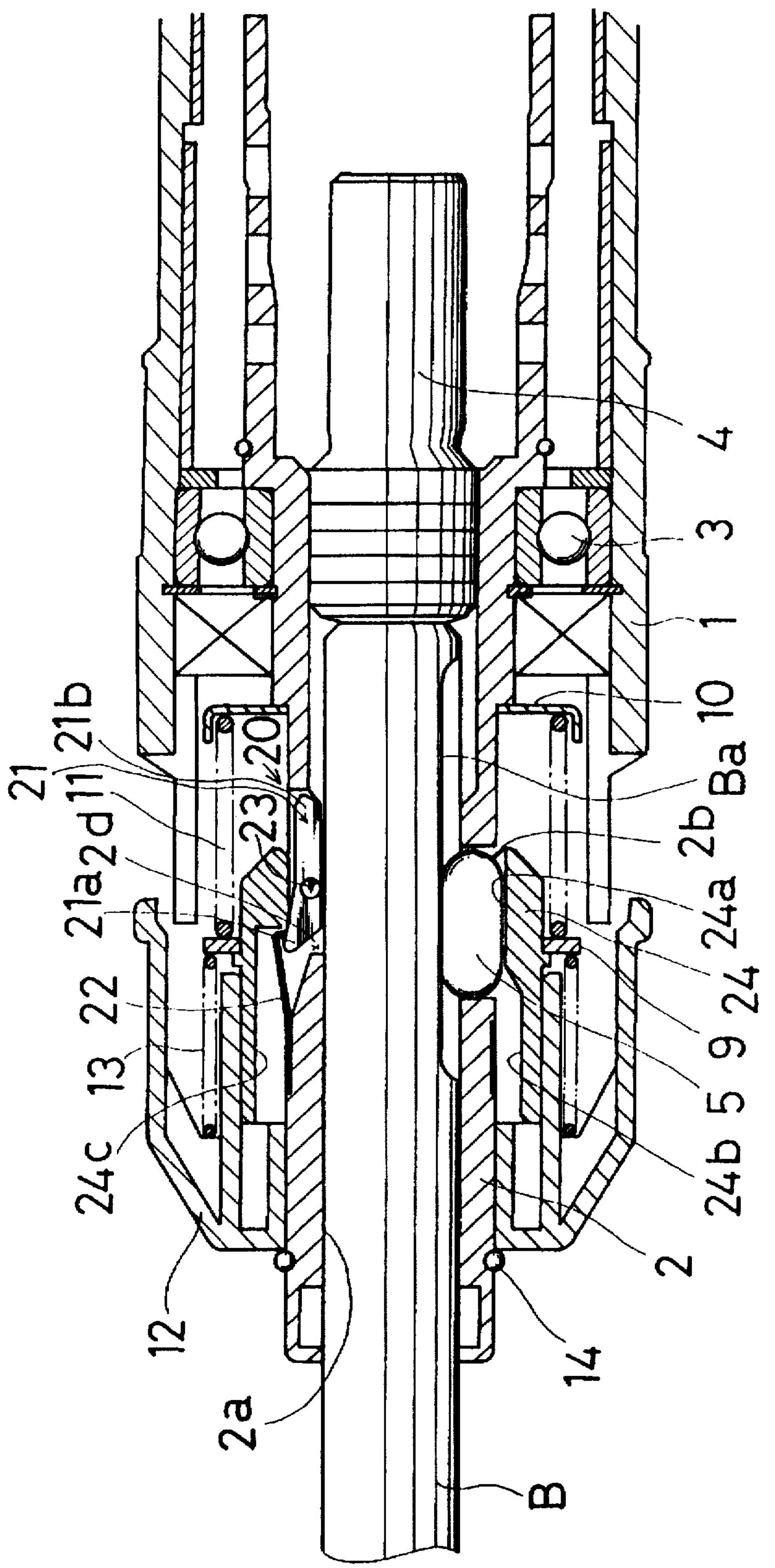
FIG. 4 is a vertical sectional view of a hammer drill incorporating a bit mounting device according to a second embodiment of the present invention and showing the state where the bit is mounted on the drill.

In the bit mounting state shown in FIG. 4, the operation sleeve 12 and the control sleeve 24 are held in their frontmost positions by means of the compression coil springs 13 and 11, respectively. The holding portion 24*a* is positioned to radially confront the keys 5, so that the keys 5 are held in engagement with the key recesses Ba of the bit B to hold the bit B not to be removed.

In this mounting state, the releasing recess 24*c* is positioned away from the rear portion 21*b* of the stopper member 21 in the axial direction. The stopper member 21 is in abutment on the bit B which is inserted into the mounting hole 2*a* of the barrel 2, so that the stopper member 21 is held to extend in parallel to the axis of the bit B or the axis of the barrel 2 against the biasing force of the leaf spring 22.

In order to remove the bit B from the barrel 2, the operator moves the operation sleeve 12 rearwardly against the biasing forces of the springs 13 and 11 so as to move the releasing sleeve 24 in the same direction. As the result, the key releasing portion 24*a* of the control sleeve 24 is brought to radially confront the keys 5, so that the keys 5 can be moved radially outwardly to retract from the mounting hole 2*a*. The bit B can therefore be removed from the barrel 2.

Figure 5:
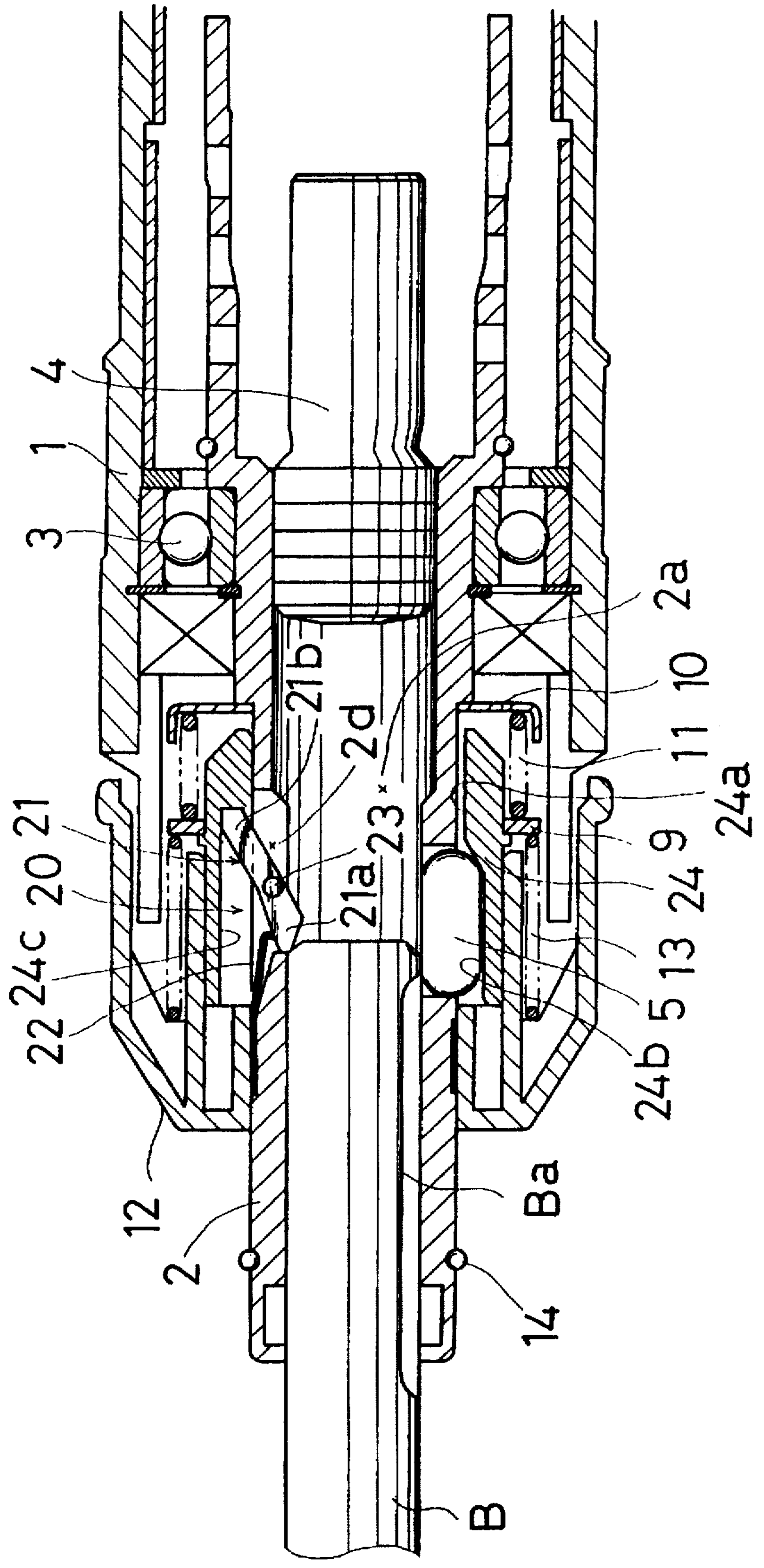
FIG. 5 is a view similar to FIG. 4 but showing the state where the bit is about to be removed from the drill.
Figure 6:
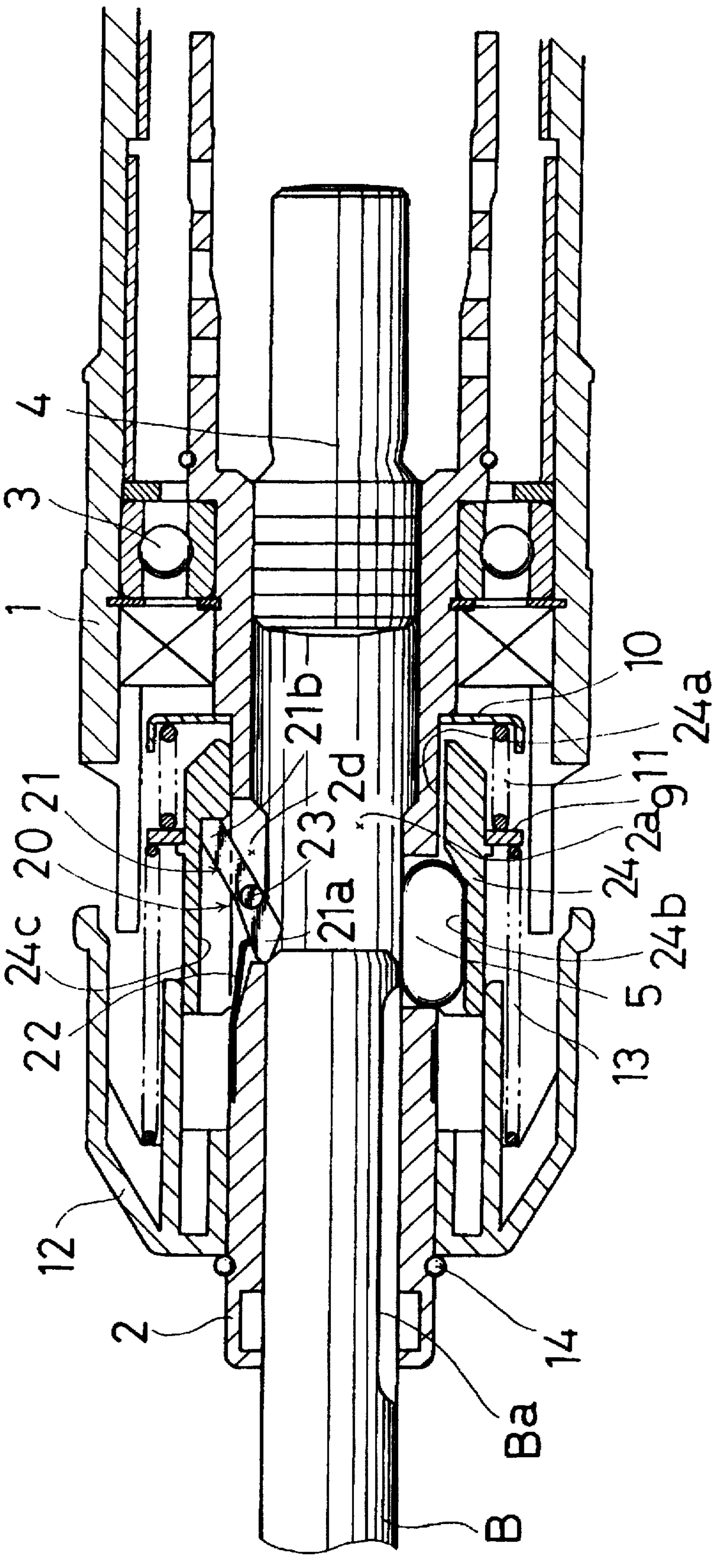
FIG. 6 is a view similar to FIG. 4 but showing the state where the bit is about to be mounted.

Since, in this state, the releasing recess 24*c* of the control sleeve 24 is positioned to radially confront the stopper member 21 as shown in FIG. 5, the stopper member 21 is pivoted in the counterclockwise direction by the biasing force of the leaf spring 22. The rear portion 21*b* of the stopper member 21 is therefore brought to enter the releasing recess 24*c* and to abut on the rear bottom corner of the releasing recess 24*c*, so that the stopper member 21 cannot be pivoted further. Thus, the stopper member 21 is held in abutment on the control sleeve 24 to prevent the same from moving in the forward direction. In addition, in this state, the front part 21*a* of the stopper member 21 partly protrudes into the mounting hole 2*a* of the barrel 2.

As described above, once the bit B has been removed from the barrel 2 by moving the control sleeve 24 rearwardly, the control sleeve 24 is held in the rearmost position, so that the keys 5 can be moved radially outwardly not to protrude into the mounting hole 2*a*. This state is maintained even after the operation sleeve 12 has returned to the frontmost position by the biasing force of the compression coil spring 13.

This means that the bit B can be remounted without moving the operation sleeve 12 rearwardly. More specifically, when the bit B is inserted into the mounting hole 2*a* as shown in FIG. 6, the rear end of the bit B abuts on the front portion 21*a* of the stopper member 21, so that the front portion 21*a* is forced to be moved radially outwardly. The stopper key 21 is therefore pivoted about the support pins 23 in the clockwise direction against the biasing force of the leaf spring 22. With such pivotal movement of the stopper key 21, the control sleeve 24 is moved rearwardly by a small distance due to abutment of the rear portion 21*b* of the stopper member 21. When the stopper member 21 is pivoted to the position parallel to the axis of the bit B, the rear portion is retracted from the releasing recess 24*c*.

When the rear portion 21*b* is retracted from the releasing recess 24*c*, the control sleeve 24 is returned to the frontmost position by the compression coil spring 11 as soon as the keys 5 are brought to engage the key recesses Ba of the bit B. When the control sleeve 24 reaches the frontmost position, the keys 5 cannot be moved radially outward, so that the bit B can be fixed in position.

As described above, also with this second embodiment, the mounting operation of the bit B can be performed without moving the operation sleeve 12 rearwardly, so that the device is excellent in operability.

The third embodiment of the present invention will now be explained with reference to FIGS. 7 to 11. A bit mounting device of this embodiment is characterized in the provision of a stopper mechanism 30. The stopper mechanism 30 is operable to prevent the keys 5 from protruding into the mounting hole 2*a* so as to indirectly prevent a control sleeve 33 from moving forwardly. Like the control sleeve 8 of the first embodiment, the control sleeve 33 has a holding portion 33*a* and a releasing portion 33*b*.

Figure 9:
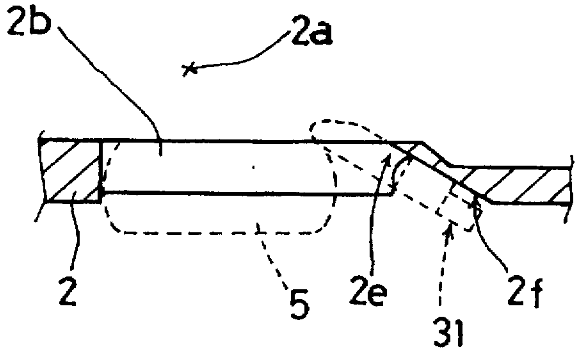
FIG. 9 is an enlarged view of a part of a control sleeve shown in FIGS. 7 and 8.
Figure 10:
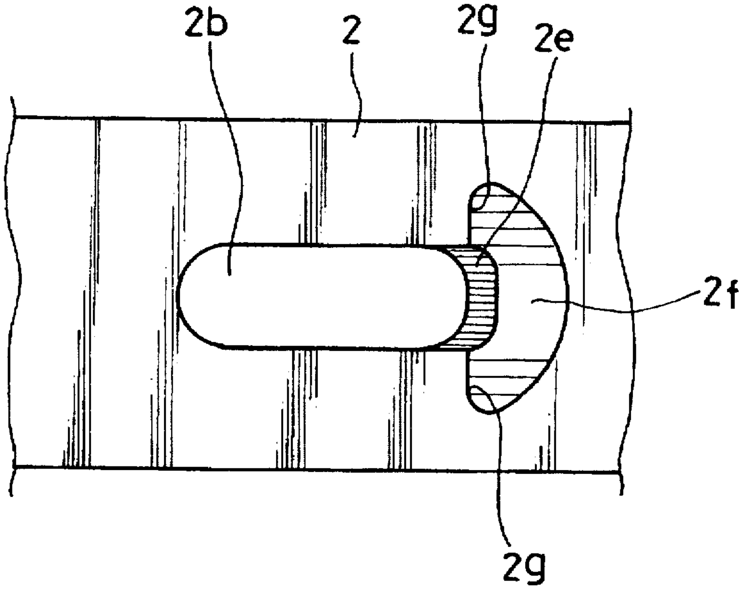
FIG. 10 is a bottom view of FIG. 9.
Figure 11:
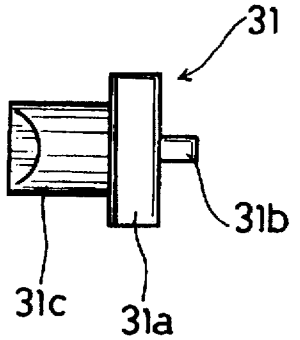
FIG. 11 is an enlarged view of a stopper pin shown in FIGS. 7 and 8.

The stopper mechanism 30 mainly comprises a stopper pin 31 disposed rearwardly of one of the keys 5. As shown in FIGS. 9 and 10, an oblique guide hole 2*e* is formed in the barrel 2 and has one end open at the rear end of the key receiving hole 2*b* for receiving one of the keys 5 described above. The stopper pin 31 is inserted into the guide hole 2*e* to extend obliquely rearward therefrom, so that the stopper pin 31 can be moved to protrude into and to retract from the mounting hole 2*a* along a path passing adjacent the rear hemispherical end of one of the keys 5. A recess 2*f* having an inclined bottom is formed in series with the rear end of the guide hole 2*e*. As shown in FIG. 10, the recess 2*f* has a width increasing in the forward direction and has a depth increasing in the same direction. The front end of the recess 2*f* has a width greater than the width of the guide hole 2*e* so as to form engaging edges 2*g* on both sides of the guide hole 2*e*. As shown in FIG. 11, the stopper pin 31 has a front portion 31c for abutment on one of the keys 5, a guide protrusion 31*a* having a greater width than the front portion 31*c*, and an engaging extension 31*b* formed integrally with the rear end of the guide protrusion 31*a*. The most advanced position or the most protruded position of the stopper pin 31 into the mounting hole 2*a* is limited through abutment of the guide protrusion 31*a* on the engaging edges 2*g* on both sides of the guide hole 2*e*. In addition, the stopper pin 31 is prevented from rotation about its axis through contacting the bottom of the recess 2*f*. When the stopper pin 31 is in its most advanced position, the front portion 31*c* is positioned inwardly adjacent the rear hemispherical end of one of the key 5, so that this key 5 is prevented from moving inwardly and does not protrude into the mounting hole 2*a*.

A compression coil spring 32 Is interposed between the stopper pin 31 and the flange member 10, so that the stopper pin 31 is biased in a direction toward the most advanced position. Here, a projection 10*a* is formed integrally with the flange member 10 by cutting a part of the same and by bending this part. One end of the compression coil spring 32 is secured to the flange member 10 by means of the projection 10*a*. The other end of the compression coil spring 32 is secured to the engaging projection 31*b* of the stopper pin 31.

Figure 7:
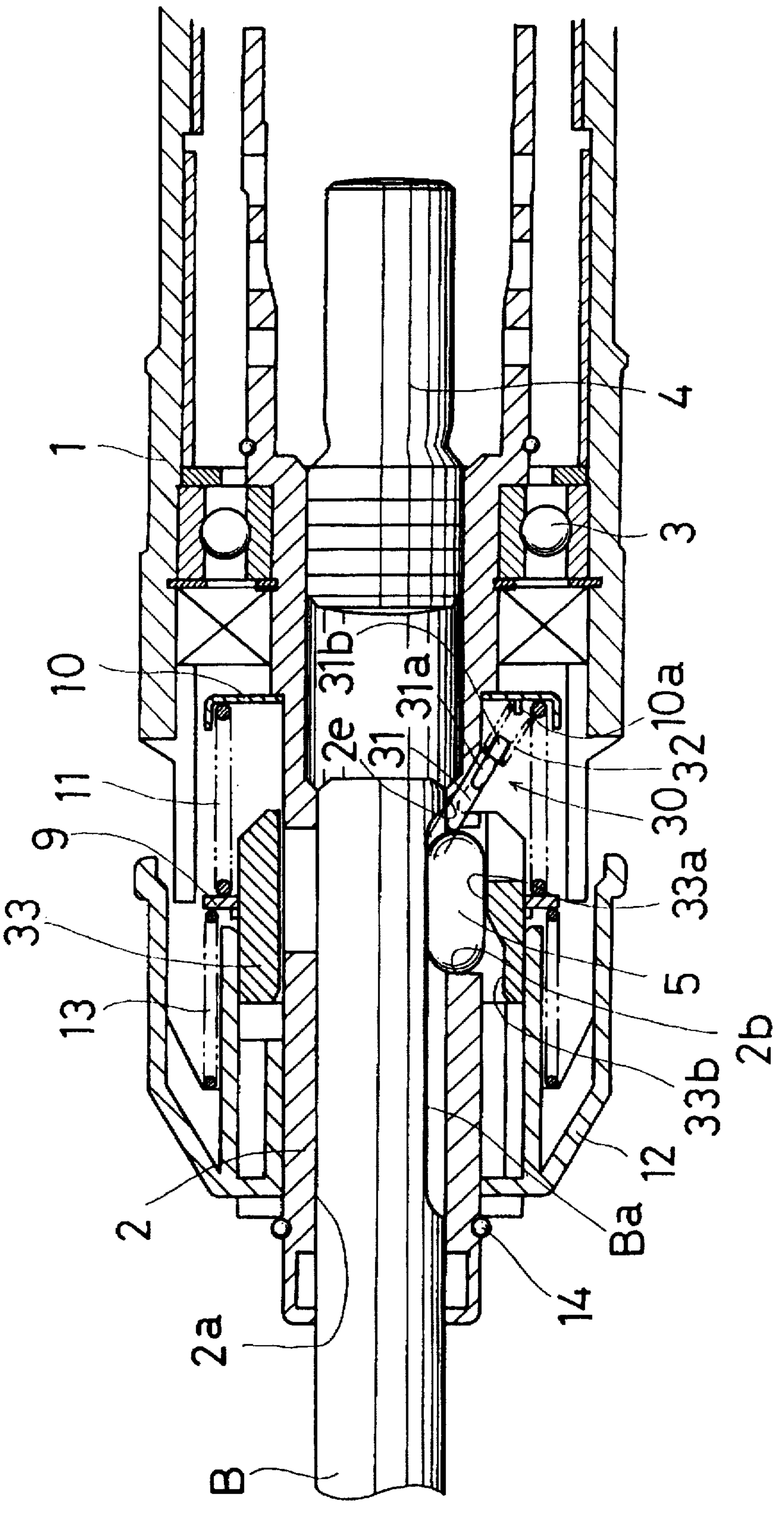
FIG. 7 is a vertical sectional view of a hammer drill incorporating a bit mounting device according to a third embodiment of the present invention and showing the state where the bit is about to be mounted on the drill.

With the third embodiment, in the bit mounting state shown in FIG. 7, the control sleeve 33 is held in the frontmost position by the compression coil spring 11, so that the keys 5 are held in engagement with their corresponding key recesses Ba of the bit B by the holding portion 33*a* of the control sleeve 33. Therefore, the bit B is prevented from removal from the barrel 2.

Figure 8:
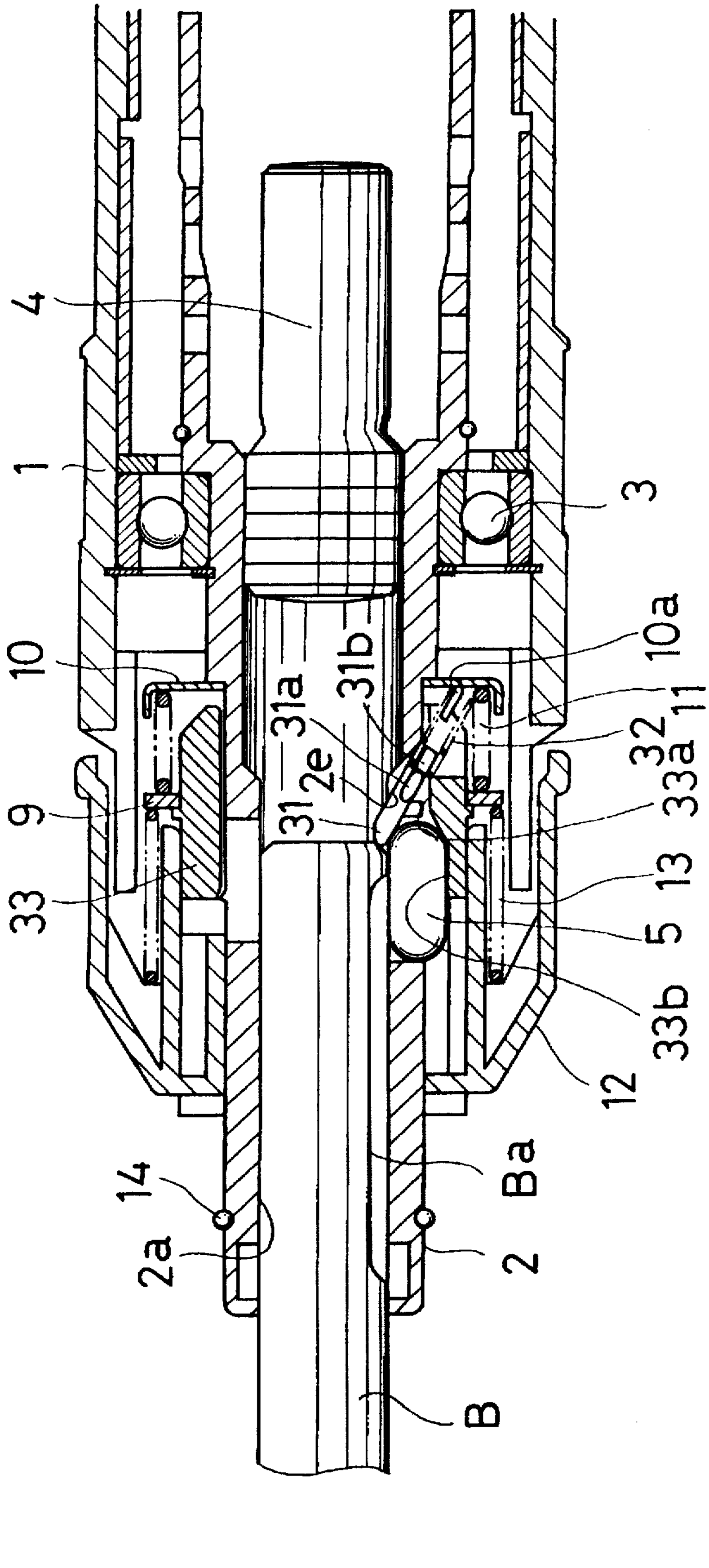
FIG. 8 is a view similar to FIG. 7 but showing the state where the bit is about to be removed from the drill.

In order to remove the bit B from the barrel 2, the operator moves the operation sleeve 12 rearwardly to move the control sleeve 33 in the same direction, so that the releasing portion 33*b* of the control sleeve 33 radially confronts the keys 5 to permit movement of the keys 5 radially outward from the mounting hole 2*a*. As the bit B is moved forwardly, the keys 5 are forced to be moved radially outward, so that the bit B can be removed. When the bit B is moved forwardly to some extent as shown in FIG. 8, the stopper pin 31 is forced to protrude into the mounting hole 2*a*, so that the front portion 31*c* of the stopper pin 31 is positioned inwardly adjacent the rear end of one of the keys 5.

One of the keys 5 is therefore prevented from moving inwardly and may not protrude into the mounting hole 2*a*. This key 5 is thus held in engagement with the key releasing portion 33*b* of the control sleeve 33, so that the releasing sleeve 33 is prevented from moving forwardly. The releasing sleeve 33 is therefore held in the rearmost position even after the bit B has been completely removed and the operation sleeve 33 has been returned to the frontmost position. Since the releasing sleeve 33 is thus held in the rearmost position, the other of the keys 5 is permitted to move radially outwardly to retract from the mounting hole 2*a*. As the result, without moving the operation sleeve 12, the bit B can be remounted on the barrel 2 by simply inserting the bit B into the mounting hole 2*a*.

Thus, when the bit B is inserted into the mounting hole 2*a* to some extent, the rearmost end of the bit B abuts on the front portion 31*c* of the stopper pin 31 and moves the same to retract from the mounting hole 2*a*. One of the keys 5 is therefore permitted to move radially inward. When the keys 5 have been brought to engage the corresponding key recesses Ba of the bit B, the control sleeve 33 is moved forwardly by the force of the spring 11. When the control sleeve 33 reaches its frontmost position, the holding portion 33*a* confronts the keys 5 so as to prevent the keys from moving radially outward. As the result, the bit B is remounted on the barrel 2 to be fixed in position relative thereto.

As described above, since the bit B can be mounted on the barrel 2 without moving the operation sleeve 12 rearwardly, the bit mounting device of the third embodiment is excellent in operability.

Figure 12:
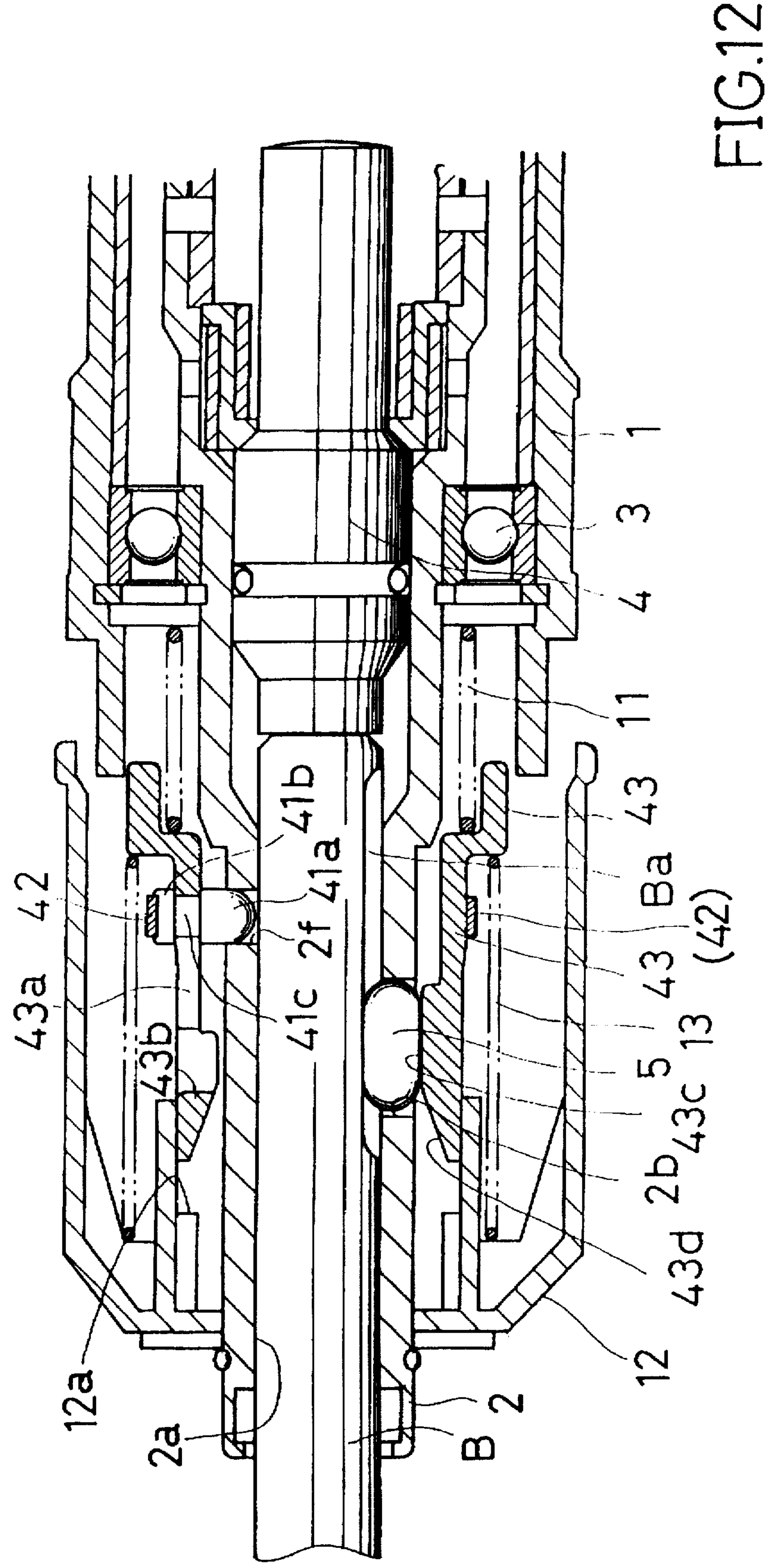
FIG. 12 is a vertical sectional view of a hammer drill incorporating a bit mounting device according to a fourth embodiment of the present invention and showing the state where the bit is mounted on the drill.
Figure 13:
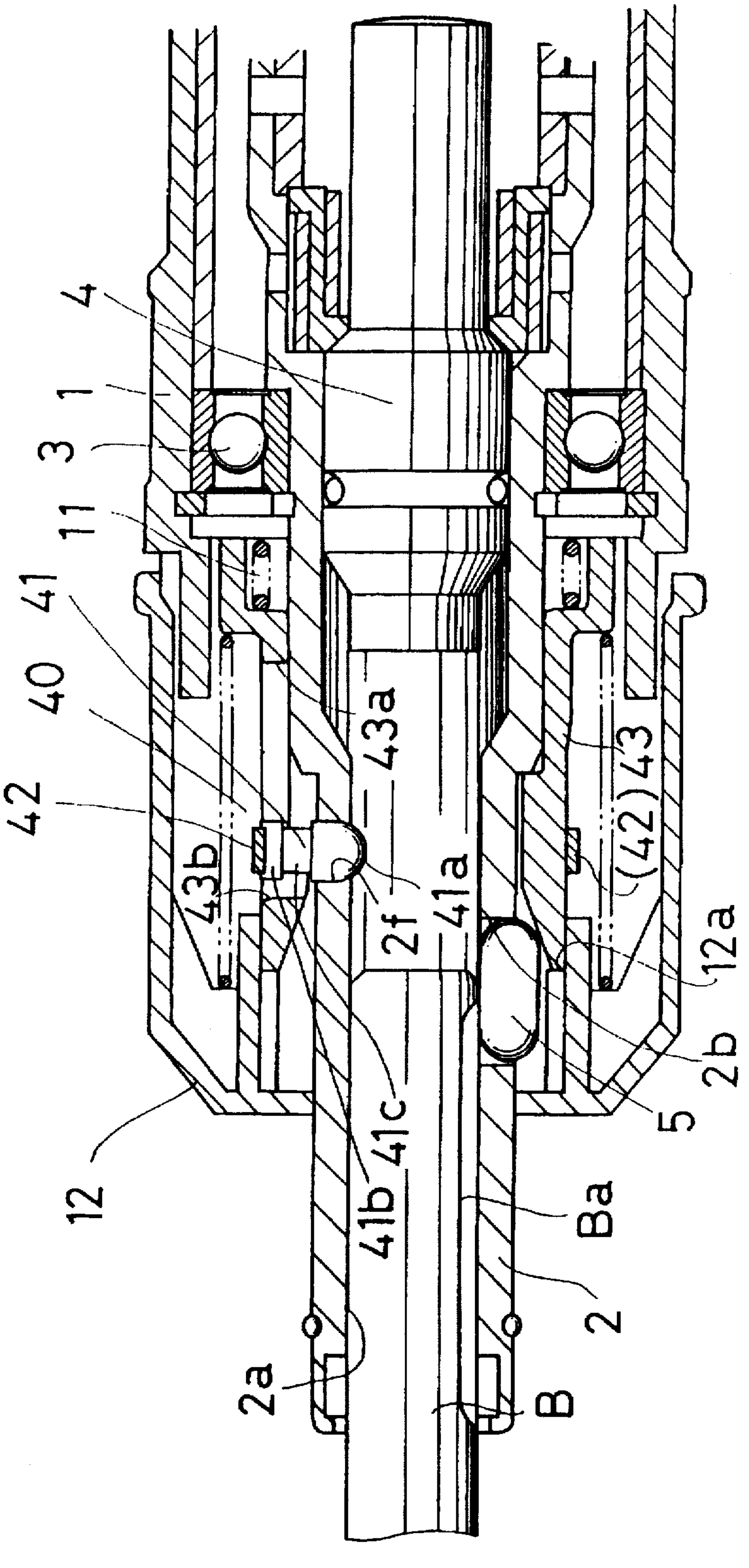
FIG. 13 is a view similar to FIG. 12 but showing the state where the bit is about to be removed from the drill.

The fourth embodiment of the present invention will now be described with reference to FIGS. 12 to 14.

This embodiment includes a stopper mechanism 40 which mainly comprises a pair of stopper pins 41 mounted on a control sleeve 43.

Figure 14:
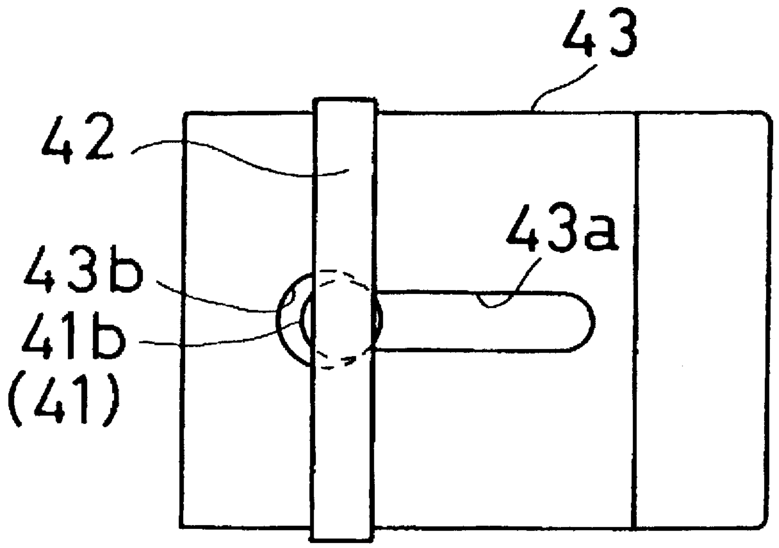
FIG. 14 is plan view of a control sleeve of the bit mounting device shown in FIG. 12.
Figure 15:
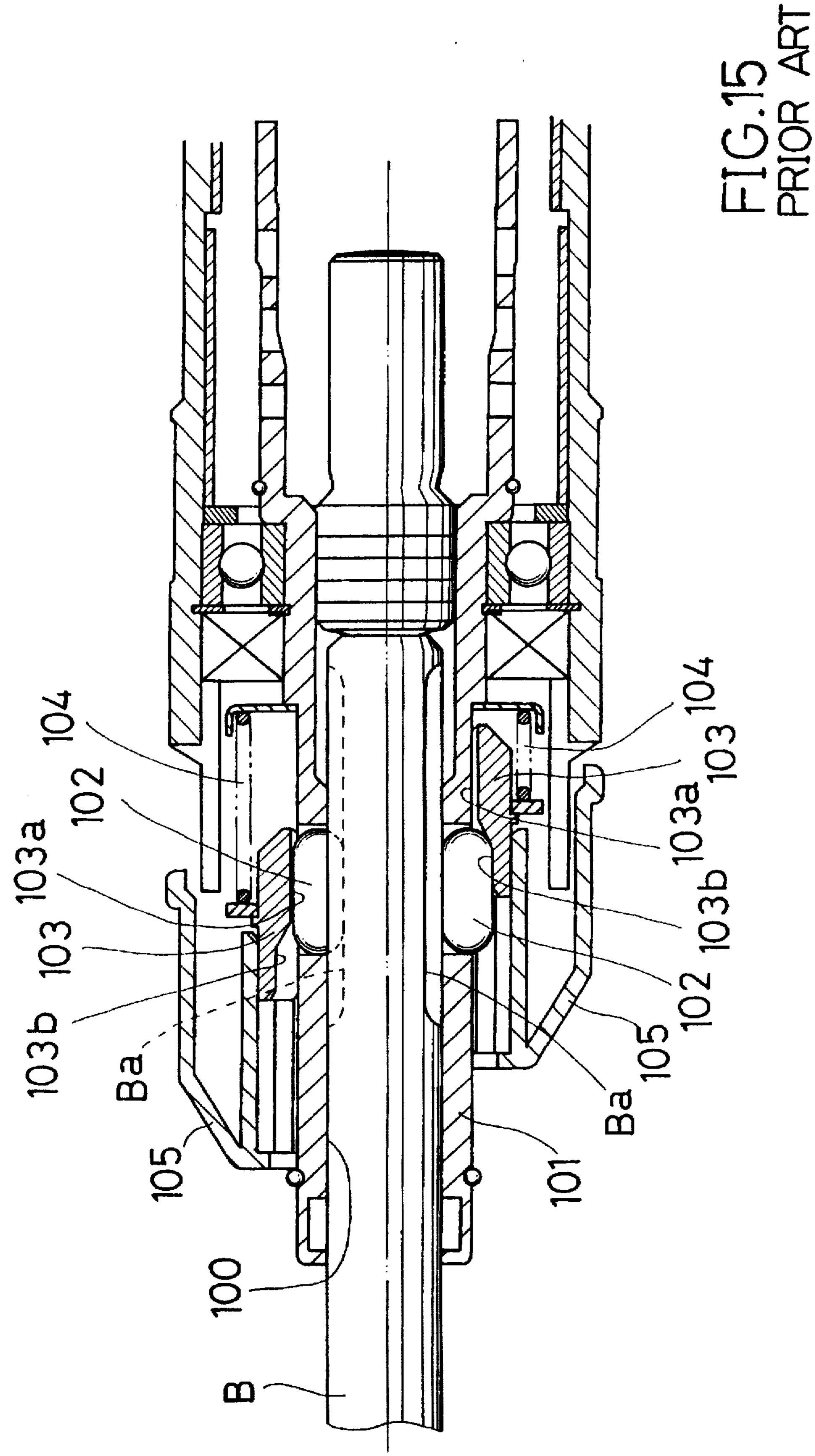
FIG.15 PRIOR ART
FIG. 15 is a vertical sectional view of a hammer drill incorporating a conventional bit mounting device.

As will be best seen from FIG. 14, a pair of elongated slots 43*a* (only one shown in FIG. 14) are formed in the control sleeve 43. The elongated slots 43*a* extend in the longitudinal direction of the control sleeve 43 (in the axial direction of the bit B or the axial direction of the barrel 2) and are opposed to each other in the diametrical direction of the control sleeve 43. A circular slot 43*b* is formed in series with the front end of each of the elongated slot 43*a* and has a diameter larger than the width of the elongated slots 43*a*.

Each of the elongated slots 43*a* or the circular slot 43*b* connected thereto is adapted to receive corresponding one of the stopper pins 41. Each of the stopper pins 41 has a hemispherical inner end 41*a*, a flange-like outer end 41*b* and a shank 41*c* connecting the inner end 41*a* and the outer end 41*b* to each other. The shank 41*c* has a diameter smaller than the width of the elongated slots 43*a*. The outer end 41*b* has a diameter smaller than the diameter of the circular slots 43*b* but larger than the width of the elongated slots 43*a*.

A pair of insertion holes 2*f* (only one shown in the drawings) are formed in the barrel 2 and are opposed to each other in the diametrical direction of the barrel 2. Each of the insertion holes 2*f* is adapted to receive the inner end 41*a* of one of the stopper pins 41. A C-shaped leaf spring 42 is fitted on both the outer ends 41*b* of the stopper pins 41 so as to bias the stopper pins 41 inwardly in the radial direction.

In addition, like the control sleeve 8 of the first embodiment, the control sleeve 43 of this embodiment has a holding portion 43*c* and a releasing portion 43*d*.

The operation of the fourth embodiment will now be explained.

In the bit mounting state shown in FIG. 8, the stopper pins 41 are in abutment on the bit B and do not protrude into the mounting hole 2*a*. In addition, in this state, the shanks 41*c* of the stopper pins 41 are positioned in engagement with their corresponding elongated slots 43*a*, so that the control sleeve 43 is held in the frontmost position by the biasing force of the spring 11 through abutment of the shanks 41*c* on the rear ends of the elongated slots 43*a*. With the control sleeve 43 in this frontmost position, the holding portion 43*c* radially confronts the keys 5 so as to prevent the keys 5 from moving radially outward, so that the bit B is prevented from being removed.

In order to remove the bit B, the operator moves the operation sleeve 12 rearwardly against the biasing force of the compression coil spring 13, so that the control sleeve 43 is moved rearwardly against the biasing force of the compression coil spring 11 through abutment of the abutting surface 12*a* of the operation sleeve 12 on the front end of the control sleeve 43. When the control sleeve 43 reaches the rearmost position, the releasing portion 43*d* radially confronts the keys 5, so that the keys 5 can be moved radially outward to retract from the mounting hole 2*a*. The bit B can therefore be removed from the barrel 2.

When the bit B has been removed from the barrel 2 with the control sleeve 43 positioned in the rearmost position, the stopper pins 41 are brought to be positioned at the circular slots 43*b*. The stopper pins 41 are then moved radially inward by the force of the leaf spring resulting in that the inner ends 41*a* protrude into the mounting hole 2*a* while the upper ends 41*b* enter the circular slots 43*b*. In this state, the upper ends 41*b* cannot be moved rearwardly to enter the elongated slots 43*a* since the diameter of the upper ends 41*b* is larger than the width of the elongated slots 43*a*. The control sleeve 43 is therefore prevented from moving forwardly by the stopper pins 41. Since the control sleeve 43 is thus held in the rearmost position after the bit B has been removed, the releasing portion 43*d* of the control sleeve 43 is held to radially confront the keys 5 so as to permit movement of the keys 5 to retract from the mounting hole 2*a*.

For the above reason, the operator is not required to move the operation sleeve 12 rearwardly for remounting the bit B. When the bit B is inserted into the mounting hole 2*a*, the rearmost end of the bit B abuts on the hemispherical inner ends 41*a* of the stopper pins 41 so as to move the same radially outwardly against the biasing force of the leaf spring 42.

As the stopper pins 41 are moved radially outwardly, the flange-like outer ends 41*b* are moved out of the circular slots 43*b*, so that only the shanks 41*c* having the diameter smaller than the width of the elongated slots 43*a* are positioned within the circular slots 43*b*. The control sleeve 43 is therefore permitted to move forwardly through the movement of the shanks 41*c* relative to the control sleeve 43 along their corresponding elongated slots 43*a*. The control sleeve 43 is therefore moved forwardly by the biasing force of the compression coil spring 11. When the control sleeve 43 reaches the frontmost position, the releasing portion 43*c* confronts the keys 5, so that the keys 5 are prevented from moving radially outward from the mounting hole 2*a*, resulting in that the bit B is prevented from being removed.

As described above, with the fourth embodiment, like the first to third embodiments, the control sleeve 43 is held in the rearmost position after the bit B has been removed, so that the keys 5 are permitted to move radially outward and that the bit B can be remounted on the barrel 2 without moving the operation sleeve 12 rearwardly. Therefore, also with the fourth embodiment, the device is excellent in operability.

In addition, also in this fourth embodiment, the compression spring 13 may be eliminated, and the operation sleeve 12 and the control sleeve 43 may be formed integrally with each other.

While the invention has been described with reference to preferred embodiments thereof, it is to be understood that modifications or variations may be easily made without departing from the spirit of this invention which is defined by the appended claims.

What is claimed is:

1. A bit mounting device for removably mounting a mounting tool which has a barrel including a mounting hole adapted for receiving the bit, comprising:

an engaging member engageable with the bit;

a control member mounted on the barrel and movable between a holding position and a releasing position, said control member in said holding position being operable to fix said engaging member in an engaging position for engagement with the bit, and said control member in said releasing position being operable to permit said engaging member to move from said engaging position to a disengaging position for disengagement from the bit;

stopper means operable to hold said control member in said releasing position when the bit is removed from the barrel;

said stopper means includes a stopper member mounted on the barrel, an engaging portion and a protruding portion;

said engaging portion being in engagement with said control member, said protruding portion protruding into the mounting hole of the barrel when the bit is removed from the barrel; and said stopper member being pushed by the bit at said protruding member, so that said engaging portion is disengaged from said control member when the bit is inserted in the mounting hole.

2. The bit mounting device as defined in claim 1 further including biasing means for normally biasing said control member in a direction toward said holding position, so that said control member returns from said releasing position to said holding position by the biasing force of said biasing means.

3. The bit mounting device as defined in claim 1 wherein said stopper member is pivotally mounted on the barrel.

4. The bit mounting device as defined in claim 1 wherein said stopper member is slidably mounted on the barrel.

5. The bit mounting device as defined in claim 1 wherein said stopper member is operable to be engaged with and disengaged from said control member by means of said engaging member.

6. The bit mounting device as defined in claim 1 wherein:

said engaging member is a key received in a key receiving hole formed in the barrel and is movable between said engaging position and said disengaging position in a radial direction of the barrel;

said key in said engaging position is in engagement with a key recess formed in the bit; and said control member is a control sleeve fitted on the barrel and is movable relative to the barrel in an axial direction of the barrel between said holding position and said releasing position.

7. The bit mounting device as defined in claim 6 wherein:

said stopper member is pivotally mounted in a stopper receiving hole formed in the barrel and has a first part and a second part on both sides of its pivotal axis; and said first part and said second part having said engaging portion and said protruding portion, respectively;

whereby said stopper member is pivoted through abutment of the bit on said protruding portion, so that said engaging portion is moved away from a position abutting on said control sleeve when the bit is inserted into the mounting hole of the barrel.

8. The bit mounting device as defined in claim 7 wherein said stopper member is a leaf spring and is deformed between said control sleeve and said barrel, so that said engaging portion resiliently abuts on one end of said control sleeve when the bit is removed from the mounting hole of the barrel.

9. The bit mounting device as defined in claim 8 wherein:

said leaf spring has said second part positioned in a moving path of said control sleeve from said holding position to said releasing position when the bit is inserted into the mounting hole;

said leaf spring is deformed between said control sleeve and the barrel so as to resiliently abut on the bit as said control sleeve is moved from said holding position to said releasing position; and said second part restores its configuration, so that said protruding portion protrudes into the mounting hole of the barrel and that said engaging portion of said first part is moved to the position for abutment on said one end of said control sleeve when the bit is removed from the mounting hole.

10. The bit mounting device as defined in claim 7 wherein said stopper member is a rigid member and wherein said stopper means further includes a spring for normally biasing said stopper member toward a position where said engaging portion is in engagement with said control sleeve and where said protruding portion protrudes into the mounting hole when the bit is removed from the barrel.

11. The bit mounting device as defined in claim 7 wherein:

said stopper member is inserted into a guide hole formed in the barrel in a position adjacent said key receiving hole and is slidably movable relative to the barrel in a longitudinal direction of said stopper member;

said protruding portion and said engaging portion is formed on one end of said stopper member on the side of the mounting hole; and said stopper means further includes a spring for normally biasing said stopper member toward a protruding position where said protruding portion protrudes into the mounting hole;

said stopper member is positioned in said protruding position and holds said control sleeve in said releasing position through holding said key in said disengaging position by said engaging portion when the bit is removed from the mounting hole; and said stopper member is retracted from said protruding position through abutment of the bit on said protruding portion when said bit is inserted into the mounting hole, so that said key is permitted to move from said disengaging position to said engaging position and that said control member is permitted to move from said releasing position to said holding position when said key is moved to said engaging position.

12. The bit mounting device as defined in claim 6 wherein:

said stopper member is a stopper pin inserted into an insertion hole formed in the barrel in its radial direction;

said protruding portion and said engaging portion are formed on an inner end and an outer end of said stopper pin, respectively;

said stopper means further includes a spring and engagement control means;

said spring normally biases said stopper pin toward a protruding position where said protruding portion protrudes into the mounting hole of the barrel; and said engaging control means is provided between said control sleeve and said engaging portion of said stopper pin and controls said stopper pin for engagement with and disengagement from said control sleeve according to the position of said control sleeve.

13. The bit mounting device as defined in claim 12 wherein:

said engagement control means includes an elongated slot and a substantially circular hole formed in said control sleeve;

said elongated slot extends in a longitudinal direction of said control sleeve for receiving said engaging portion of said stopper pin;

said circular hole is formed in series with one end of said elongated slot and has a diameter larger than the width of said elongated slot;

said engaging portion of said stopper pin has a shank and a flange formed on an outer end of said shank;

said shank has a diameter smaller than the width of said elongated slot;

said flange has a diameter larger than the width of said elongated slot but smaller than the diameter of said circular hole;

said shank is positioned in said elongated slot and said flange is in abutment on an outer surface of said control sleeve so as to prevent said protruding portion from protruding into the mounting hole against the biasing force of said spring when said control sleeve is in said holding position;

said flange is brought to enter said circular hole when the bit is removed from the mounting hole after said control sleeve is moved from said holding position to said releasing position, so that said protruding portion protrudes into the mounting hole and that said flange confronts a peripheral wall of said circular hole to prevent said stopper sleeve from moving from said releasing position to said holding position through abutment of said flange on said peripheral wall of said circular hole; and said stopper pin is moved radially outwardly through abutment of the bit on said protruding portion when the bit is inserted into the mounting hole, so that said flange is moved out of said circular hole to permit said control sleeve to move from said releasing position to said holding position.

14. The bit mounting device in claim 13 wherein said spring is a leaf spring having a C-shaped configuration and is slidably fitted on said control sleeve, and wherein said flange of said stopper pin is secured to said leaf spring.

15. A bit mounting device for removably mounting a bit on a tool which has a barrel including a mounting hole adapted for receiving the bit, comprising:

an engaging member engageable with the bit;

a control member mounted on the barrel and movable between a holding position and a releasing position, said control member in said holding position being operable to fix said engaging member in an engaging position for engagement with the bit, and said control member in said releasing position being operable to permit said engaging member to move from said engaging position to a disengaging position for disengagement from the bit;

stopper means operable to hold said control member in said releasing position when the bit is removed from the barrel;

said stopper means includes a stopper member mounted on the barrel, an engaging portion and a protruding portion;

said engaging portion being in engagement with said control member, and said protruding portion protruding into the mounting hole of the barrel when the bit is removed from the barrel;

said stopper member being pushed by the bit at said protruding member, so that said engaging portion is disengaged from said control member when the bit is inserted in the mounting hole; and further including biasing means for normally biasing said control member in a direction toward said holding position, so that said control member returns from said releasing position to said holding position by the biasing force of said biasing means.

* * * * *